United States Patent [19]

Nakajima

[11] Patent Number: 5,608,813

[45] Date of Patent: *Mar. 4, 1997

[54] METHOD FOR COMPRESSING DYNAMIC RANGES OF IMAGES USING A MONOTONOUSLY DECREASING FUNCTION

[75] Inventor: Nobuyoshi Nakajima, Kanagawa-ken, Japan

[73] Assignee: Fuji Photo Film Co., Ltd., Kanagawa, Japan

[ * ] Notice: The term of this patent shall not extend beyond the expiration date of Pat. No. 5,454,044.

[21] Appl. No.: 417,963

[22] Filed: Apr. 6, 1995

Related U.S. Application Data

[62] Division of Ser. No. 225,343, Apr. 8, 1994, Pat. No. 5,454,044, which is a continuation of Ser. No. 93,991, Jul. 21, 1993, abandoned, which is a continuation of Ser. No. 646,123, Jan. 28, 1991, abandoned.

[30] Foreign Application Priority Data

Jan. 29, 1990 [JP] Japan .................................... 2-18206

[51] Int. Cl.⁶ ..................................................... G06K 9/36
[52] U.S. Cl. .......................... 382/132; 382/260; 382/275
[58] Field of Search ..................................... 382/128, 132, 382/260, 263, 264, 275; 358/447; 378/98.2, 98.12; 364/413.13; H04N 1/40, 5/32

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,302,672 | 11/1981 | Kato et al. | 250/327.1 |
| 4,315,318 | 2/1982 | Kato et al. | 364/515 |
| 4,317,179 | 2/1982 | Kato et al. | 364/515 |
| 4,346,409 | 8/1982 | Ishida et al. | 358/280 |
| 4,387,428 | 6/1983 | Ishida et al. | 364/414 |
| 4,794,531 | 12/1988 | Morishita et al. | 364/413.13 |
| 4,903,205 | 2/1990 | Hishinuma | 364/413.13 |
| 5,051,902 | 9/1991 | Hishinuma | 364/413.13 |
| 5,454,044 | 9/1995 | Nakajima | 382/132 |

FOREIGN PATENT DOCUMENTS

| | | | |
|---|---|---|---|
| 56-11395 | 2/1981 | Japan | G21K 4/00 |
| 61-5193 | 2/1986 | Japan | G06F 15/62 |

OTHER PUBLICATIONS

"Digital Image Processing in Chest Radiology", SPIE, vol. 626, 1986, pp. 259–267, C. R. Mitchell et al.
"Selective Exposure Radiography Using Digitally–Formed X–Ray Beam Attenuators", SPIE, vol. 419, 1983, pp. 282–288, B. H. Hasegawa et al.
"Forward Looking Infrared (FLIR) Image Enhancement for the Automatic Target Cuer System", SPIE, vol. 238, 1980, pp. 91–102, Chun Moo Lo.

Primary Examiner—Andrew Johns
Attorney, Agent, or Firm—Sughrue, Mion, Zinn, Macpeak & Seas

[57] ABSTRACT

With a method for compressing a dynamic range of an image, an original image signal Sorg representing an original image is processed, and a processed image signal Sproc representing an image having a narrower dynamic range than the original image is thereby generated. The method comprises the steps of calculating the value of an unsharp mask signal Sus corresponding to each of picture elements in the original image by averaging the values of image signal components of the original image signal Sorg, which image signal components represent the picture elements belonging to a predetermined region surrounding each picture element. Values of the processed image signal Sproc are calculated with the formula

$$Sproc = Sorg + f1(Sus)$$

where f1(Sus) represents a function, the value of which decreases monotonously as the value of the unsharp mask signal Sus increases. Alternatively, in lieu of the function f1(Sus), a function f2(Sus) is employed, the value of which decreases monotonously as the value of the unsharp mask signal Sus increases, and the differential coefficient of which is continuous.

12 Claims, 7 Drawing Sheets

METHOD FOR COMPRESSING DYNAMIC RANGES OF IMAGES USING A MONOTONOUSLY DECREASING FUNCTION

This is a divisional of application Ser. No. 08/225,343 filed Apr. 8, 1994 (issued Sep. 26, 1995 as U.S. Pat. No. 5,454,044), which is a continuation of application Ser. No. 08/093,991 filed Jul. 21, 1993 (subsequently abandoned), which is a continuation of application Ser. No. 07/646,123 filed Jan. 28, 1991 (also subsequently abandoned).

BACKGROUND OF THE INVENTION

1. Field of the Invention

This invention relates to a method for compressing a dynamic range of an image, with which an original image signal representing an original image is processed, and a processed image signal representing an image having a narrower dynamic range than the original image is thereby generated.

2. Description of the Prior Art

Techniques for reading out a recorded image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored therein during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the image recording and reproducing systems, with which image signals are generated and visible images are reproduced from the image signals, it often occurs that portions of an image, which are to be used and therefore are required to have an appropriate image density in the reproduced image, have image density levels ranging widely from a low density to a high density. Also, it often occurs that what portions of an image having a wide range of image density are to be used and therefore are required to have an appropriate image density in the reproduced image. In such cases, the image signal representing the original image is processed such that the high-density parts of the original image may have an appropriate level of image density in the reproduced image. Also, the image signal representing the original image is processed such that the low-density parts of the original image may have an appropriate level of image density in the reproduced image. Thereafter, both of the images reproduced from the image signals, which have thus been processed in different ways, are displayed side by side on a single display device.

However, if a plurality of images are displayed side by side on a single display device, problems will occur in that the images inevitably become small in size and therefore hard to observe.

In order that parts of an image covering as wide a range of image density as possible can be used, the level of contrast of the parts of the image having a high or low image density or the level of contrast of the whole image has heretofore been rendered low such that the difference between the highest image density and the lowest image density is small, i.e. such that the dynamic range of the image is narrow.

However, if the level of contrast is rendered low, problems will occur in that details of the image information in the image region, at which the level of contrast has been lowered, becomes hard to observe.

How the problems described above occur will be described hereinbelow.

Figure 8:
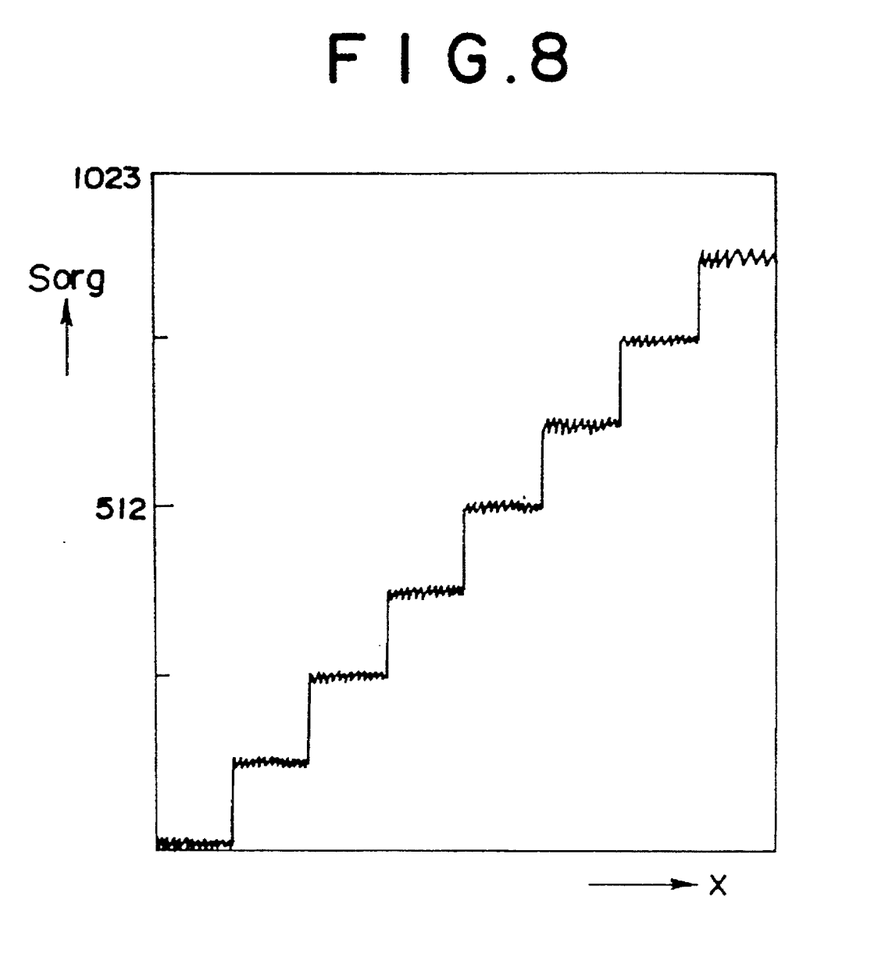
FIG. 8 is a graph showing an example of how the values of the image signal components of an original image signal Sorg are distributed, which image signal components represent picture elements located along a certain direction (the direction indicated by the arrow x) on an original image.

FIG. 8 is a graph showing an example of how the values of the image signal components of an original image signal Sorg are distributed, which image signal components represent picture elements located along a certain direction (the direction indicated by the arrow x) on an original image. As a whole, the values of the image signal components of the original image signal Sorg are distributed in a step-like pattern along the direction indicated by the arrow x (i.e. the image density of the original image changes step-wise along the direction indicated by the arrow x). Each step part of the distribution of the image density includes a fine change having a comparatively high spatial frequency.

Figure 9A:
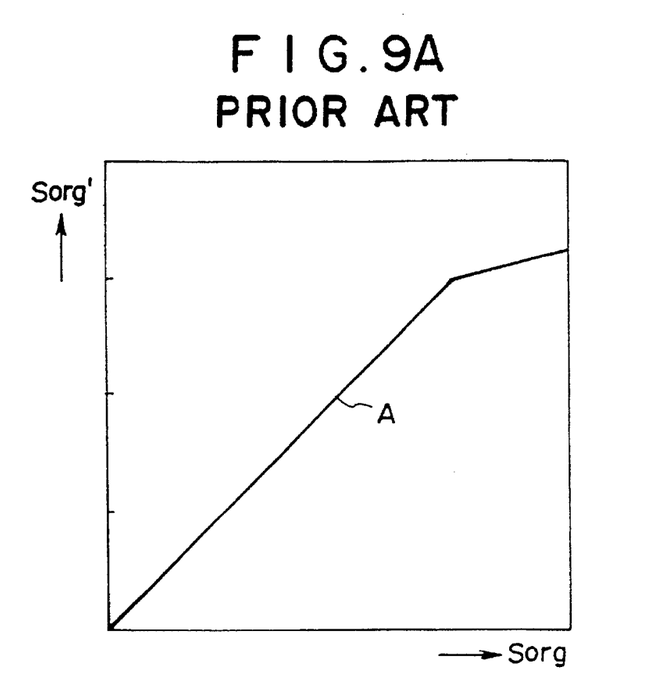
FIG. 9A is a graph showing an example of characteristics with which an original image signal Sorg representing an image is transformed into an image signal Sorg' such that the dynamic range of the image may be compressed by lowering the level of contrast of part having a high image density.
Figure 9B:
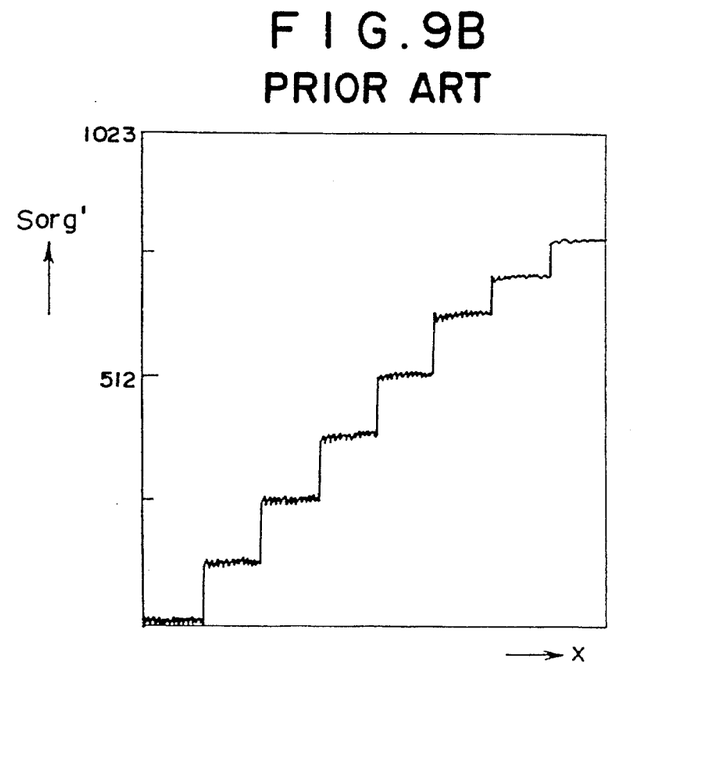
FIG. 9B is a graph showing how the values of the image signal components of the image signal Sorg' resulting from the transformation with the characteristics illustrated in FIG. 9A are distributed, which image signal components represent picture elements located along the direction indicated by the arrow x on the image.

FIG. 9A is a graph showing an example of characteristic with which an original image signal Sorg representing an image is transformed into an image signal Sorg' such that the dynamic range of the image may be compressed by lowering the level of contrast of the parts having a high image density. FIG. 9B is a graph showing how the values of the image signal components of the image signal Sorg' resulting from the transformation with the characteristics illustrated in FIG. 9A are distributed, which image signal components represent picture elements located along the direction indicated by the arrow x on the image.

In this example, the original image signal Sorg having values shown in FIG. 8 is transformed into the image signal Sorg' having values lying on the line A shown in FIG. 9A. As a result, as illustrated in FIG. 9B, the level of image density in the part having a high image density become low. Also, the level of contrast of the fine image structures represented by the fine change in each step part of the distribution of the image density, which step part falls within the high density region, becomes low. Therefore, the fine image structures having a high image density, which image structures are to be used and therefore are required to have good image quality in the reproduced image, become very hard to observe.

Figure 10A:
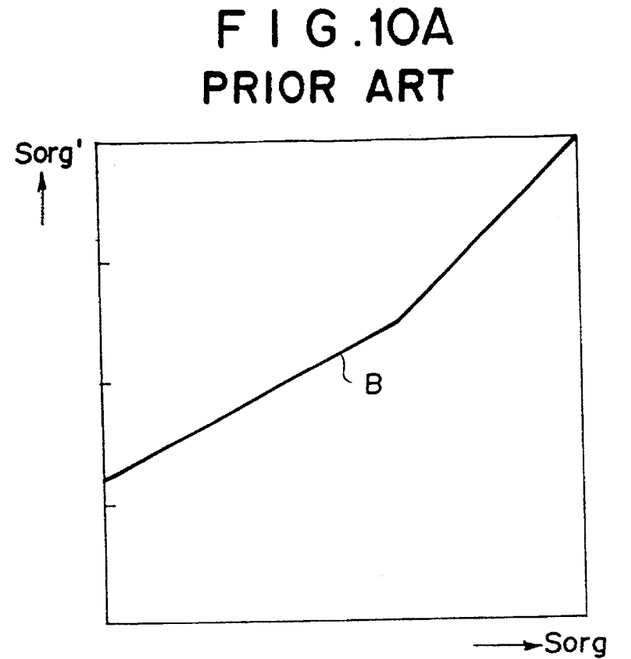
FIG. 10A is a graph showing an example of characteristics with which an original image signal Sorg representing an image is transformed into an image signal Sorg' such that the dynamic range of the image may be compressed by lowering the level of contrast of part having a low image density.
Figure 10B:
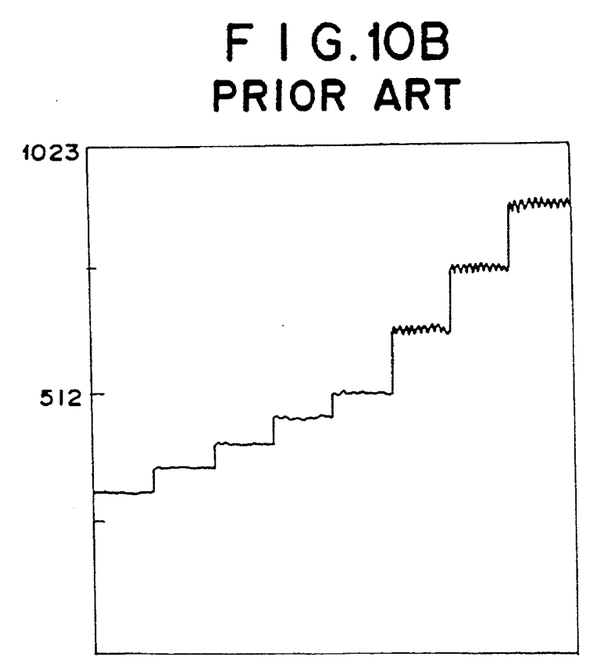
FIG. 10B is a graph showing how the values of the image signal components of the image signal Sorg' resulting from the transformation with the characteristics illustrated in FIG. 10A are distributed, which image signal components represent picture elements located along the direction indicated by the arrow x on the image.

FIG. 10A is a graph showing an example of characteristics with which an original image signal Sorg representing an image is transformed into an image signal Sorg' such that the dynamic range of the image may be compressed by lowering the level of contrast of part having a low image density. FIG. 10B is a graph showing how the values of the image signal components of the image signal Sorg' resulting from the transformation with the characteristics illustrated in FIG. 10A are distributed, which image signal components represent picture elements located along the direction indicated by the arrow x on the image.

In this example, the original image signal Sorg having values shown in FIG. 8 is transformed into the image signal Sorg' having values lying on the line B shown in FIG. 10A. In such cases, as illustrated in FIG. 10B, the fine image structures having a low image density become very hard to observe.

SUMMARY OF THE INVENTION

The primary object of the present invention is to provide a method for compressing a dynamic range of an image, with which the range of image density of an image is compressed such that parts of the image covering a wide range of image density can be used to produce good image quality in the reproduced visible image, and the image quality of fine image structures at each of the parts having various levels of image density may be kept high.

Another object of the present invention is to provide a method for compressing a dynamic range of an image, wherein an image signal representing the image is processed such that no artificial contour occurs in the visible image reproduced from the processed image signal.

The present invention provides a first method for compressing a dynamic range of an image, with which an original image signal Sorg representing an original image is processed, and a processed image signal Sproc representing an image having a narrower dynamic range than the original image is thereby generated, the method for compressing a dynamic range of an image comprising the steps of:

i) calculating the value of an unsharp mask signal Sus corresponding to each of picture elements in said original image by averaging the values of image signal components of said original image signal Sorg, which image signal components represent the picture elements belonging to a predetermined region surrounding each said picture element, and ii) calculating the values of said processed image signal Sproc with the formula $$Sproc=Sorg+f1(Sus) \qquad (1)$$

where f1(Sus) represents a function, the value of which decreases monotonously as the value of said unsharp mask signal Sus increases.

The present invention also provides a second method for compressing a dynamic range of an image, with which an original image signal Sorg representing an original image is processed, and a processed image signal Sproc representing an image having a narrower dynamic range than the original image is thereby generated, the method for compressing a dynamic range of an image comprising the steps of:

i) calculating the value of an unsharp mask signal Sus corresponding to each of picture elements in said original image by averaging the values of image signal components of said original image signal Sorg, which image signal components represent the picture elements belonging to a predetermined region surrounding each said picture element, and ii) calculating the values of said processed image signal Sproc with the formula $$Sproc=Sorg+f2(Sus) \qquad (2)$$

where f2(Sus) represents a function, the value of which decreases monotonously as the value of said unsharp mask signal Sus increases, and the differential coefficient of which is continuous.

The value of f1(Sus) or f2(Sus) need not necessarily change for every value of the unsharp mask signal Sus, and may not change for a certain range of values of the unsharp mask signal Sus.

With the first and second methods for compressing a dynamic range of an image in accordance with the present invention, the unsharp mask signal Sus is generated by emphasizing the low spatial frequency components of the original image signal Sorg. Thereafter, by using the function f(Sus), i.e. f1(Sus) or f2(Sus), the value of which decreases monotonously as the value of the unsharp mask signal Sus increases, values of the processed image signal Sproc are calculated by compressing the dynamic range of the image with the formula $$Sproc=Sorg+f(Sus) \qquad (3)$$

Therefore, the dynamic range of the whole image is compressed. Also, the contrast of fine image structures, which have many comparatively high spatial frequency components and are located at each of parts having various levels of image density, can be kept high. Accordingly, parts of the image covering a wide range of image density can be used and may have good image quality in the reproduced visible image.

Also, with the first method for compressing a dynamic range of an image in accordance with the present invention, by merely modifying the characteristics of the function f1(Sus), the dynamic range of parts of the image, which parts have low levels of image density, and the dynamic range of parts of the image, which have high levels of image density can be compressed. The process for compressing the dynamic range of parts of the image, which parts have low levels of image density, is advantageous when, for example, a mediastinum region is to be used in an X-ray image of the chest. The process for compressing the dynamic range of parts of the image, which parts have high levels of image density, is advantageous when, for example, a skin edge region is to be used in an X-ray image of bones of limbs.

With the second method for compressing a dynamic range of an image in accordance with the present invention, the function f2(Sus), the differential coefficient of which is continuous, is utilized. Therefore, no artificial contour occurs in the image represented by the processed image signal Sproc, and an image having good image quality can be obtained.

A technique for compressing a dynamic range of an X-ray image of the chest of a human body is disclosed, for example, in "Journal of Japanese Society of Radiological Technology", Vol. 45, No. 8, p. 1030, August 1989, Mitsuhiro Anan, et al. The disclosed technique comprises the steps of:

1) calculating the values of an unsharp mask signal Sus, 2) doubling the values of the unsharp mask signal Sus, the resulting value being clipped at the maximum value (1023) in cases where the resulting value exceeds the maximum value (1023), $$a = \begin{Bmatrix} 2 \times Sus & (2 \times Sus < 1023) \\ 1023 & (2 \times Sus \geq 1023) \end{Bmatrix} \quad (4)$$

3) calculating the values of an image signal representing a reversal image with the formula $$b = 1023 - a$$

and 4) adding the products of the values of the image signal representing the reversal image and a coefficient, $\alpha$, to the values of the image signal representing the original image with the formula $$c = Sorg + \alpha \cdot b \quad (\alpha = 0.3) \quad (5)$$

The disclosed technique has the effects of compressing the dynamic range of an image and keeping the contrast of fine image structures, which are present in each of parts having various levels of image density, high.

However, with the disclosed technique, only the dynamic range of parts of the image, which parts have low levels of image density, can be compressed. With the disclosed technique, the dynamic range of parts of the image, which parts have high levels of image density, cannot be compressed. Therefore, the disclosed technique has the drawback in that it is not suitable for images of bones of limbs, or the like. On the other hand, with the first method for compressing a dynamic range of an image in accordance with the present invention, the dynamic range of parts of the image, which parts have high levels of image density, can also be compressed efficiently. Also, the disclosed technique has the risk that an artificial contour may occur in a visible image reproduced from the processed image signal which adversely affects the image quality of the visible image. On the other hand, the second method for compressing a dynamic range of an image in accordance with the present invention has no such risk. As described above, the first and second methods for compressing a dynamic range of an image in accordance with the present invention eliminate the drawbacks of the disclosed technique. Also, the first and second methods for compressing a dynamic range of an image in accordance with the present invention are composed of simpler steps than the disclosed technique. Additionally, the first and second methods for compressing a dynamic range of an image in accordance with the present invention are advantageous in that, for example, the compression ratio can be set arbitrarily.

DESCRIPTION OF THE PREFERRED EMBODIMENTS

The present invention will hereinbelow be described in further detail with reference to the accompanying drawings.

In the embodiments described below, an X-ray image is stored on a stimulable phosphor sheet.

Figure 6:
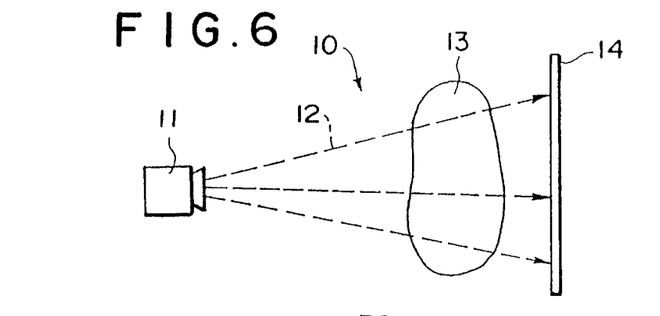
FIG. 6 is a schematic view showing an example of an X-ray image recording apparatus.

FIG. 6 is a schematic view showing an example of an X-ray image recording apparatus.

With reference to FIG. 6, X-rays 12 are produced by an X-ray source 11 of an X-ray image recording apparatus and irradiated onto an object 13. The X-rays, which have passed through the object 13, impinge upon a stimulable phosphor sheet 14. In this manner, an X-ray image of the object 13 is stored on the stimulable phosphor sheet 14.

Figure 7:
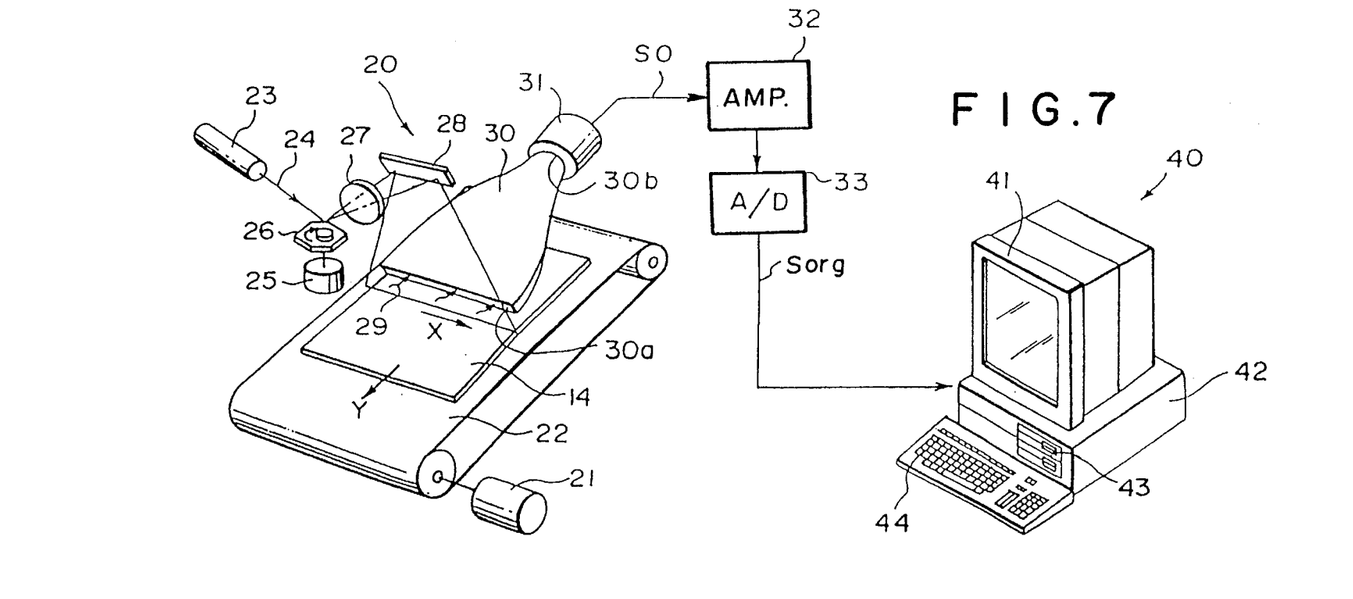
FIG. 7 is a perspective view showing an example of an X-ray image read-out apparatus.

FIG. 7 is a perspective view showing an example of an X-ray image read-out apparatus.

With reference to FIG. 7, a stimulable phosphor sheet 14, on which an X-ray image has been stored in the X-ray image recording apparatus shown in FIG. 6, is placed at a predetermined position in a read-out means 20.

The stimulable phosphor sheet 14 is then conveyed in a sub-scanning direction indicated by the arrow Y by an endless belt 22, which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fθ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material such as fan acrylic plate and has a linear light input face 30a, positioned so that it extends along the main scanning line on the stimulable phosphor sheet 14, and a ring-shaped light output face 30b, positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal SO generated by the photomultiplier 31 is logarithmically amplified by a logarithmic amplifier 32, and digitized by an A/D converter 33. In this manner, an original image signal Sorg is obtained. The original image signal Sorg is then fed into an image processing and reproducing means 40. The image processing and reproducing means 40 is constituted of a CRT display device 41 which reproduces and displays a visible image, a main body 42 in which a CPU, an internal memory, an interface, or the like, are incorporated, a floppy disk drive unit 43 which operates a floppy disk, and a keyboard 44 from which necessary information is fed into the X-ray image read-out apparatus.

After the original image signal Sorg representing the original X-ray image of the object 13 is fed into the image processing and reproducing means 40, the dynamic range of the image is compressed by transforming the original image signal Sorg in the manner described below.

Figure 1:
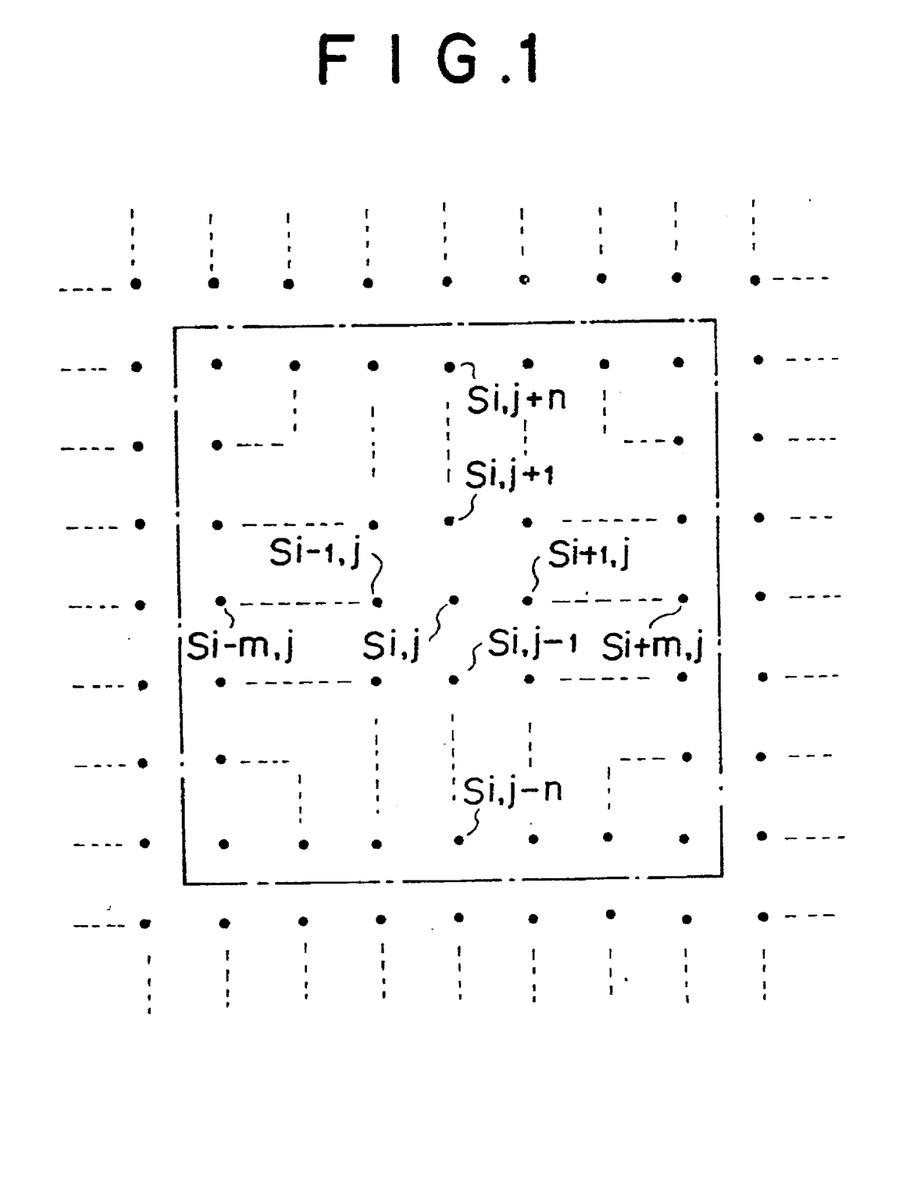
FIG. 1 is an explanatory view showing picture elements in an original image and image signal components of an original image signal Sorg, which represent the picture elements.

FIG. 1 is an explanatory view showing picture elements in an original image and image signal components of an original image signal Sorg, which represent the picture elements. In FIG. 1, dots represent the picture elements, and the symbols such as Si,j represent the image signal components of the original image signal Sorg which represent the corresponding picture elements. The value of an unsharp mask signal $$\overset{ij}{Sus}$$

for the picture element, which is located in the middle of the region surrounded by the chained line, is calculated with the formula $$\overset{ij}{Sus} = \frac{\sum\limits_{k=-m}^{m} \sum\limits_{l=-n}^{n} S_{i+k,j+l}}{(2m+1)\cdot(2n+1)}$$

By carrying out the calculation for every picture element, an unsharp mask signal Sus for the whole image is generated. The values of m and n are determined arbitrarily in accordance with the intervals, with which the original image signal Sorg is sampled, the characteristics of the original X-ray image, or the like.

Figure 2:
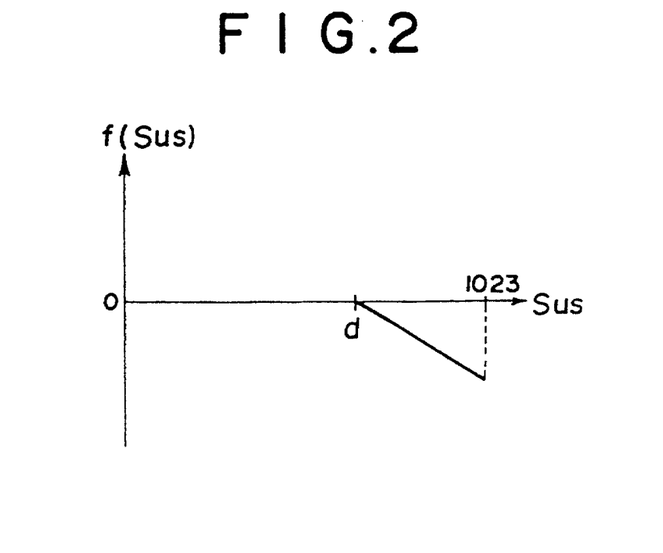
FIG. 2 is a graph showing an example of a monotonously decreasing function, in which the value of an unsharp mask signal Sus serves as a variable and which is employed in an embodiment of the method for compressing a dynamic range of an image in accordance with the present invention.

FIG. 2 is a graph showing an example of a monotonously decreasing function, in which the value of an unsharp mask signal Sus serves as a variable and which is employed in an embodiment of the method for compressing a dynamic range of an image in accordance with the present invention.

The maximum value of the unsharp mask signal Sus is 1,023. When the value of the unsharp mask signal Sus falls within the range of 0 to d, the value of the function f(Sus) is zero. When the value of the unsharp mask signal Sus is larger than d, the function f(Sus) takes values lying on the inclined straight line. For each picture element (i,j), a calculation using the function f(Sus) is carried out with the formula $$\overset{ij}{Sproc} = S_{ij} + f\left(\overset{ij}{Sus}\right)$$

In this manner, a processed image signal Sproc corresponding to all of the picture elements in the image is generated.

Figure 3:
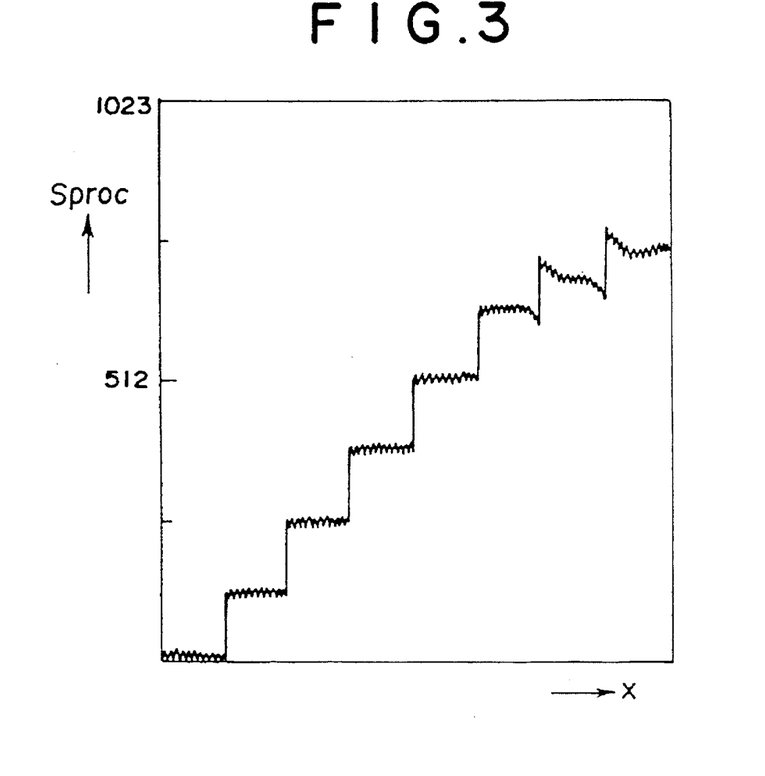
FIG. 3 is a graph showing how the values of the image signal components of a processed image signal Sproc are distributed, the processed image signal Sproc being obtained by processing an original image signal Sorg made up of a series of image signal components, which represent picture elements located along the direction indicated by the arrow x on an original image, and the values of which are distributed as shown in FIG. 8.

FIG. 3 is a graph showing how the values of the image signal components of a processed image signal Sproc are distributed, the processed image signal Sproc being obtained by processing an original image signal Sorg made up of a series of image signal components, which represent picture elements located along the direction indicated by the arrow x on an original image, and the values of which are distributed as shown in FIG. 8.

As illustrated in FIG. 3, the dynamic range of the parts of the image, which are associated with large values of the unsharp mask signal Sus, i.e. which have high levels of mean image density, is compressed. Also, the contrast of fine image structures, which have many comparatively high spatial frequency components and are located at each of said parts, is kept at the same level as the original contrast. Therefore, when a visible image is reproduced from the processed image signal Sproc and displayed on the CRT display device 41, a visible image is obtained wherein the levels of image density of the parts, which originally had a high image density, are lower than before, and wherein the contrast of the fine image structures in each of said parts is kept high. In cases where, as illustrated in FIG. 3, the image density changes step-wise, overshooting or undershooting occurs in the processed image signal Sproc. However, practically, images have no such sharp stepwise changes in image density. Therefore, the problem with regard to overshooting or undershooting need not be taken into consideration.

Figure 4:
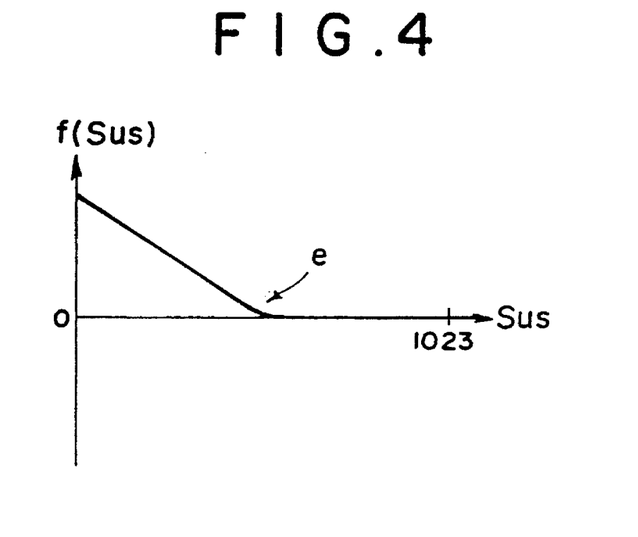
FIG. 4 is a graph showing another example of a monotonously decreasing function, in which the value of an unsharp mask signal Sus serves as a variable and which is employed in another embodiment of the method for compressing a dynamic range of an image in accordance with the present invention.

FIG. 4 is a graph showing another example of a monotonously decreasing function, in which the value of an unsharp mask signal Sus serves as a variable and which is employed in another embodiment of the method for compressing a dynamic range of an image in accordance with the present invention. When the unsharp mask signal Sus takes small values, the value of the function f(Sus) changes. When the unsharp mask signal Sus takes values higher than the level, e, the value of the function f(Sus) is zero.

Figure 5:
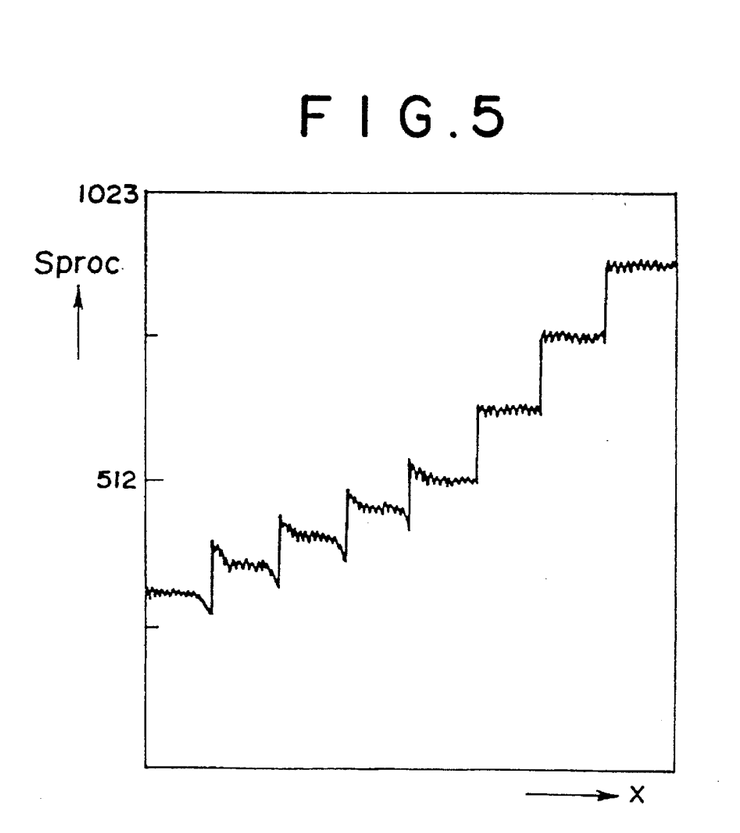
FIG. 5 is a graph showing how the values of the image signal components of a processed image signal Sproc are distributed, the processed image signal Sproc being obtained when the function f(Sus) illustrated in FIG. 4 is employed in the course of processing an original image signal Sorg made up of a series of image signal components, the values of which are distributed as shown in FIG. 8.

FIG. 5 is a graph showing how the values of the image signal components of a processed image signal Sproc are distributed, the processed image signal Sproc being obtained when the function f(Sus) illustrated in FIG. 4 is employed in the course of processing an original image signal Sorg made up of a series of image signal components, the values of which are distributed as shown in FIG. 8.

As illustrated in FIG. 5, the dynamic range of the parts of the image, which have low levels of image density, is compressed. Also, the contrast of fine image structures, which are located at each of said parts, is kept at the same level as the original contrast. Therefore, when a visible image is reproduced from the processed image signal Sproc and displayed on the CRT display device 41, a visible image is obtained wherein the levels of image density of the parts, which originally had a low image density, are higher than before, and wherein the contrast of the fine image structures in each of said parts is kept high.

As shown in FIG. 4, the line representing the function f(Sus) is not folded sharply at the point, e, but the differential coefficient of the function f(Sus) is continuous. In cases where a function f(Sus) is used, which has characteristics such that the line representing it folds sharply at the point, e, even if no particular contour is present in the original image, an artificial contour will occur at the part having the image density corresponding to the point, e, in the visible image reproduced from the processed image signal Sproc. In this embodiment, the function f(Sus) is employed which has characteristics such that the differential coefficient is continuous, no artificial contour occurs in the reproduced visible image.

In the embodiments described above, an X-ray image is read out from a stimulable phosphor sheet, and an image signal is thereby generated. The method for compressing a dynamic range of an image in accordance with the present invention is broadly applicable when image signals are detected from various kinds of recording media, on which images have been recorded, e.g. when an X-ray image is read out from X-ray film.

I claim:

1. A method for compressing a dynamic range of an original image by transforming an original image signal Sorg into a processed image signal Sproc, wherein the original image signal Sorg comprises a plurality of image signal components Sij which correspond to respective picture elements of the original image, said method comprising steps of:

for each picture element in the original image, selecting picture elements within a predetermined region surrounding each picture element;

for each picture element in the original image, determining an average value of image signal components Sij corresponding to the selected picture elements, the average values thus determined defining an unsharp mask signal Sus for the original image;

defining a function f(Sus) the value of which decreases monotonously as the unsharp mask signal Sus increases;

combining the original image signal Sorg with the function f(Sus) to define a processed image signal Sproc corresponding to a processed image having a compressed dynamic range relative to the original image.

2. A method as defined in claim 1 wherein said original image is a radiation image.

3. A method as defined in claim 2 wherein said radiation image has been stored on a stimulable phosphor sheet.

4. A method as defined in claim 3 wherein an image signal, which represents said radiation image and serves as said original image signal Sorg, is detected by exposing said stimulable phosphor sheet to stimulating rays, which cause said stimulable phosphor sheet to emit light in proportion to the amount of energy stored thereon during its exposure to radiation, and photoelectrically detecting the emitted light.

5. A method as defined in claim 4 wherein said stimulating rays are a laser beam.

6. A method as defined in claim 1 wherein said original image is an X-ray image which has been recorded on photographic film.

7. A method for compressing a dynamic range of an original image by transforming an original image signal Sorg into a processed image signal Sproc, wherein the original image signal Sorg comprises a plurality of image signal components Sij which correspond to respective picture elements of the original image, said method comprising steps of:

for each picture element in the original image, selecting picture elements within a predetermined region surrounding each picture element;

for each picture element in the original image, determining an average value of image signal components Sij corresponding to the selected picture elements, the average values thus determined defining an unsharp mask signal Sus for the original image;

defining a function f(Sus) the value of which decreases monotonously as the unsharp mask signal Sus increases, and the differential coefficient of which is continuous;

combining the original image signal Sorg with the function f(Sus) to define a processed image signal Sproc corresponding to a processed image having a compressed dynamic range relative to the original image.

8. A method as defined in claim 7 wherein said original image is a radiation image.

9. A method as defined in claim 8 wherein said radiation image has been stored on a stimulable phosphor sheet.

10. A method as defined in claim 9 wherein an image signal, which represents said radiation image and serves as said original image signal Sorg, is detected by exposing said stimulable phosphor sheet to stimulating rays, which cause said stimulable phosphor sheet to emit light in proportion to the amount of energy stored thereon during its exposure to radiation, and photoelectrically detecting the emitted light.

11. A method as defined in claim 10 wherein said stimulating rays are a laser beam.

12. A method as defined in claim 7 wherein said original image is an X-ray image which has been recorded on photographic film.

* * * * *